2,885,360

CLAY BODIED ORGANIC LIQUIDS AND A PROCESS FOR THE PREPARATION THEREOF

Walter Linwood Haden, Jr., Haddonfield, and Cletus O. Martin, Camden, N.J., assignors, by mesne assignments, to Minerals & Chemicals Corporation of America, a corporation of Maryland No Drawing. Application September 8, 1951
Serial No. 245,774

10 Claims. (Cl. 252—28)

This invention relates to a process for bodying organic liquids and the products produced thereby, and more particularly is concerned with a process utilizing naturally-occurring clay for increasing the viscosity characteristics of organic liquids and with the products formed thereby.

Recently it has been proposed to modify various clays having base exchange capacities of at least 25 in a manner to provide gel-forming clays having organophilic, rather than the normal hydrophilic, properties and consequently which are dispersible in organic liquids. It has been suggested to produce grease, for example, by dispersing the modified clay in petroleum oil. The suggested method for modifying clay having the required base exchange capacity involves reaction in water of the clay with an onium compound whereby the exchangeable inorganic cation of the clay is exchanged for the cation of the onium compound, to produce an organophilic onium-clay reaction product. The onium-clay reaction product then is dispersed in an organic liquid to form a gel therein.

While such process of modifying clay to produce organophilic onium-clay and of forming gels by the addition thereof to certain organic liquids has met with some success, it is not entirely satisfactory for the reason that the process is expensive and further is limited necessarily to the use of clays having high base exchange capacities and to the use of onium compounds for reaction therewith.

Accordingly, an object of this invention is to provide a novel process using naturally-occurring clay for bodying, or increasing the viscosity characteristics of, organic liquids.

Another object of this invention is to provide a process for dispersing certain naturally-occurring clay in organic liquids whereby to body or increase the viscosity characteristics of the organic liquids.

A further object is to provide dispersions of organic liquids and naturally-occurring clay having a surface area greater than 50 square meters per gram, measured by the method specified hereinafter.

Other objects and features of the invention will be apparent from the description which follows.

We have discovered that certain naturally-occurring clay having a free moisture content, defined below, of not less than 5%, and preferably between 10 and 30%, may readily be dispersed in organic liquids to impart thereto body or increased viscosity characteristics by subjecting a mixture of the clay, an organic liquid, and a dispersing agent to agitation or shear while simultaneously vaporizing a portion of the free moisture of the clay. By this novel process the clay is substantially completely dispersed throughout the organic liquid and remains dispersed over long periods of time without showing any signs of settling. Moreover, the dispersed clay imparts body or increased viscosity characteristics to the organic liquid.

The process of the present invention may be applied to organic liquids of all types. The process may be utilized for example, in the production of adhesives, gelled gasoline grease, ink, lacquers, oil base drilling mud, paints, and varnishes, and also in strengthening or extending rubber, plastics, resins, etc. Thus, the process is applicable, for example, for increasing the viscosity characteristics among other organic liquids, of liquid aliphatic hydrocarbons including alkanes such as pentane, hexane, heptane, octane, nonane, decane, and heavier paraffins, alkenes and alkynes such as the butenes, pentenes, the hexenes, and the butynes, pentynes, hexynes, and heavier alkenes and alkynes, and alkadienes such as the butadienes, pentadienes, hexadienes, and heavier diolefins; of liquid aliphatic halogen derivatives including monohaloalkanes such as the chlorides, bromides, and iodides of propane, butane, pentane, hexane, and heavier alkanes, polyhaloalkanes such as chloroform, iodoform, bromoform, carbon tetrachloride, and unsaturated halo-compounds such as chloroprene; of liquid aliphatic oxygen derivatives including alcohols such as methanol, ethanol propanols, butanols, pentanols, and higher molecular weight alcohols, ethers such as the ethyl ethers, propyl ethers, butyl ethers, and halohydrins, and alkene oxides such as bromoethanol, chloroethanol, bromopropanols, and propylene oxide, butylene oxide, and higher molecular weight halohydrins and alkene oxides, saturated aldehydes and ketones such as acetaldehyde, propionaldehyde, butyraldehyde and acetone, butanone, pentanone, saturated and unsaturated acids, such as formic, acetic, propionic butyric, acrylic, crotonic, vinylacetic acids, halogen-substituted acids such as chloroacetic acids, bromopropionic acids, iodopropionic acids, chlorovaleric acids, hydroxide-substituted acids such as glycolic and lactic acids, oxo-substituted acids such as glyoxalic, formylacetic, pyruvic acids, acid anhydrides such as ethanoic, propanoic, and butanoic anhydrides, acid halides such as acetyl chloride, propionyl bromide, butyryl chloride, and esters such as ethyl acetate, methyl propionate, ethyl butyrate, methyl valerate; of liquid aliphatic sulfur compounds including thioalcohols, such as methanethiol and ethanethiol, thioethers such as methylthiomethane and ethylthioethane, sulfonic acids and other sulfur derivatives; of aliphatic nitrogen derivatives including nitroalkanes such as nitromethane, nitroethane, nitropropane, and nitrobutane, amides such as formamide and acetamide, urea, primary, secondary, and tertiary amines such as ethylamine, ethylmethylamine, diethylamine, trimethylamine, ethylmethylpropylamine, nitriles such as acetonitriles, propionitrile and butane nitrile; of liquid alicyclic compounds including cycloalkanes such as cyclopentane, cyclohexane, and cycloheptane, and cycloalkenes such as cyclopentene, cyclohexene, and cycloheptene; of aromatic hydrocarbons including benzene, toluene and xylenes, of aromatic halogen compounds such as fluorobenzene, dichlorobenzene, dibromobenzene, benzyl chloride, and benzal chloride; liquid aromatic oxygen derivatives including phenols and aromatic alcohols such as phenol, pyrocatechol, resorcinol, hydroquinone, pyrogallol, cresol, benzyl alcohol, cinnamyl alcohol, and benzohydrol, aromatic ethers such as methoxybenzene, ethoxybenzene and phenoxybenzene, aromatic aldehydes, such as benzaldehyde, salicylaldehyde, and vanillin, aromatic ketones, such as acetophenone, and propiophenone, and aromatic acids; of aromatic sulfur derivatives such as the sulfonic acids of benzene and toluene; of aromatic nitrogen compounds including aromatic nitro compounds such as nitrobenzene, nitrotoluenes, and nitro-oxylenes, and aromatic amines such as aniline, toluidines, and methyl- and dimethylanilines; and of heterocyclic compounds including coumarin, furan, indole, pyrrole, pyrazole, pyridine, and quinoline, and mixtures thereof.

Especially, however, the process of our invention is suitable for bodying or increasing the viscosity characteristics of oils to produce greases, oil base drilling muds, and other products. Vegetable oils such as the triglycerides, mineral oils, essential oil of certain plants such, for example, as the terpenes, and silicone oils, all may be treated in accordance with the present invention to produce bodied dispersions of clay and oil which have good stability. Thus, grease produced in accordance with this invention from petroleum oil, for example, possesses all the good qualities of commercial soap greases and has the additional advantage of being capable of withstanding temperatures up to 500° F. and higher without substantial loss of body and of having improved resistance to water washing.

Any naturally-occurring clay may be used in the practice of this invention which has a surface area after drying to a temperature of 350° F. of 50 square meters per gram or more, and preferably 100 square meters per gram or more, as determined by a nitrogen adsorption method described by S. Brunauer, P. H. Emmett, and E. Teller in their article entitled "Adsorption of Gases in Multi-Molecular Layers," on page 309 of Journal of the American Chemical Society vol. 60, February 1938, using the molecular size data of H. K. Livingston presented in his article entitled "Cross-Sectional Areas of Molecules Adsorbed on Solid Surfaces," on page 569, Journal of the American Chemical Society, vol. 66, April 1944. The clays particularly adaptable in the process of the invention are the sub-bentonites which are a class of non-swelling montmorillonite clay, nontronite, illite, hectorite, beidellite, saponite, halloysite, and fuller's earth, particularly of the Georgia-Florida type. The surface areas of the enumerated clays are in excess of 50 square meters per gram. Georgia-Florida type fuller's earth, which is especially suitable in practice of the invention and produces excellent products has a surface area between about 120 and 140 square meters per gram.

Raw clay, as mined, is suitable for use in the process or it may be dried or partially dried and, if desired, ground or crushed. It is essential to the operation of the process, however, that in any event the free moisture content of the clay be adjusted by the addition or elimination of water to a value of not less than 5%. By "free moisture content" of the clay, as used herein, is meant the weight of moisture removed from the clay upon drying a sample thereof to constant weight at a temperature of 220° F., expressed as the weight percent of such sample.

While suitable clay having a free moisture content of 5 to 50% or higher is useful in bodying organic liquids in accordance with the present invention, it is preferable to dry the clay to a free moisture content of from 5 to 30%.

The dispersing agent may be either water-soluble or insoluble and of any type, that is cationic, anionic, or non-ionic. Dispersing agents which may be employed in accordance with this invention include salts of carboxylic acids or fatty acid soaps such as sodium or potassium oleate, stearate, palmitate, laurate, myristate, arachidate, or ricinoleate; salts of amino acids (or alkylated or phenylated amino acids) such as valine, cystine, arginine, hydroxy-valine, glutamic acid, hydroxyglutamic acid, citrulline, phenylalanine, tryptophane; salts of peptides and polypeptides which are either synthetic or are degradation products of proteins such as casein, glue, albumin; esters of higher fatty acids with tertiary amino alcohols such as triethanolamine or alkyl ethers of tertiary amino alcohols; acid phosphates or phosphonates of oleic or ricinoleic acids or their esters, or polyethylene-glycol esters of phosphoric acid; sulfated oils, sulfated fatty alcohols as cetyl sulfate, lauryl sulfate or oleyl alcohol sulfate, sulfated fatty acid monoglycerides, sulfated fish oils, castor oil, tallow, or olive oil; salts of amines as the primary and secondary fatty amine acetates and chlorides and their quaternary compounds such as tallow fatty dialkyl dimethylammonium chloride and cocoanut fatty alkyl dimethylbenzylammonium chloride; acylated or alkylated alkylene polyamines such as ethylenediamine or diethylenetriamine or polyethylene polyamines; alkane sulfonates such as petroleum sulfonates of the water-soluble green acid type; products of esterification of a fatty acid with isothionic acid, taurine or methyl taurine, sulfoacetates, sulfoacetamides, sulfopropionates, sulfobutyrates, or sulfosuccinates of cocoanut fatty oleyl, cetyl, or stearyl alcohols, sulfotricarboxy aliphatic acids, lignin sulfonate, quaternary compounds of fatty alkyl halides with substituted morpholines, benzimidazoles, and hexyl amines; alkyl aromatic sulfonates such as propylated or butylated naphthalene or naphthol sulfonates, di- and trialkyl benzene and alkyl toluene sulfonates in which the alkyl group may be amyl or butyl, alkylated diphenyl ether sulfonates, or alkylated phenyl sulfonates in which the alkyl group contains from 9 to 15 carbon atoms; non-ionic dispersing agents such as polyoxyalkylene oxide derivatives of fatty alcohols, mercaptans, ether alcohol, fatty acids, or natural phosphatides as lecithin; fatty acid esters of sugar alcohols; substituted ethanol amines; condensation products of polyhydric alcohols and polybasic water-soluble acids as the stearic acid ester of glycol tartrate; and water-soluble substituted glucosides.

The quantity of dispersing agent mixed with the clay and organic liquid depends, of course, on the particular dispersing agent, clay, and organic liquid used, and may vary over a relatively wide rnage. In practice, however, it has been found that from about ½% to about 10% by weight of dispersing agent in the mixture usually is sufficient.

Similarly, the amount of clay required to body the organic liquid is dependent upon several factors including the particular organic liquid to be bodied, and the extent to which it is desired to increase the viscosity characteristics thereof.

It has been found, however, that the mixture should contain from about 1% to 15% by weight of clay on a volatile-free (heated to constant weight at 1700° F.) basis, and that for production of grease, best results are obtained using from 3% to 9% clay on a volatile-free basis.

In practicing the invention, the raw clay preferably is dried to a free moisture content of from 5% to 30% and ground to a desired size such, for example, as finer than 60 mesh. It is to be understood, however, that the clay as mined may be utilized without being subjected to drying or grinding or other treatment. If it is desired to produce a bodied liquid free of grit, raw clay is first dispersed in water and allowed to stand to permit coarse particles to settle out; after this, clay particles having a selected maximum size may substantially be obtained by supercentrifuging or flotation of the slurry and drying the clay particles remaining in suspension preferably to a free-moisture content of from 5% to 30%.

Then the clay having a free moisture content of at least 5% is placed together with proper amounts of the dispersing agent and oil in a suitable vessel provided with means for applying shear to, or agitating, the mixture such, for example, as roller mill, colloidal mill, homogenezing mill, or similar device. While continuously agitating or applying shear to the mixture, heat is also applied to raise the temperature sufficiently to cause a portion of the free moisture in the clay to vaporize. As the free moisture first begins to vaporize, it will be noted that simultaneously therewith the oil will thicken considerably. Additional vaporization of the free moisture results in further gelling of the oil, especially when the free moisture content of the clay is high, that is, 30% to 50% or more. Agitation is continued until the desired final grease product has been obtained. Such grease consists of a stable dispersion of clay in the organic liquid and substantially does not lose body even at temperatures as high as 500° F. or more.

It is essential that the mixture be subjected to shearing force, such as agitation while being heated sufficiently to vaporize a portion or all of the free-moisture of the clay. Although the exact mechanism of the process is not understood, and the invention is not to be limited to any theory of operation, it appears that colloidal separation of the particles occurs as the free moisture vaporizes and consequently fairly rapid release of vapor is desirable. If desired, the organic liquid may be preheated to reduce or eliminate the heat to be supplied to the mixture to raise it to a temperature sufficient to vaporize the free moisture of the clay. It is preferred to heat the mixture, while applying shear thereto, to a temperature of from about 220° F. to 300° F. Higher or lower temperature, however, may be utilized, especially in cases where the vessel containing the mixture is subjected to a partial vacuum or is pressurized. The necessary heat may be applied to the mixture by any means, for example, such as steam coils provided in the vessel or an exterior burner. However, frequently heat generated during agitation is sufficient to raise the temperature of the mixture to the point such that the free moisture of the clay is vaporized, and in such cases it is unnecessary to employ additional heating means.

The order in which the clay, dispersing agent and organic liquid are mixed is of no particular consequence. Thus the dispersing agent may first be mixed with the organic liquid, and then added to the clay. Or, it may be preferred to mix the clay and organic liquid, and then add the dispersing agent thereto. Again, all three materials may be mixed simultaneously.

In some cases, dispersion of clay in a particular organic liquid in accordance with the invention occurs with considerable increase in viscosity but without gelling of the organic liquid. If desired, gelation can be accomplished in such cases by the addition of minor quantities of polar substances such as amines, alcohols, and organic acids. Examples of such substances are ethylene diamine; monomethyl amine; hexamethylene diamine; methyl, ethyl, and isopropyl alcohol; ethylene glycol; diethylene glycol; glycerine; acetic acid and oxalic acid. Water also sometimes causes gelling. The quantity of polar substance added varies considerably dependent upon many factors including the particular clay-organic liquid dispersion under consideration, but may readily be determined by observation. In practice, it has been found that from about ½% to 5% is usually sufficient.

The invention will be further illustrated by the examples which follow. It should be understood, however, that these examples are given primarily for illustrative purposes and the invention in its broader aspects is not limited thereto.

The grit-free colloidal fuller's earth, where used in the examples below, was prepared in the following manner: 1,000 g. of raw Georgia-Florida fuller's earth having a volatile matter content of from 50% to 60% was dispersed in 2440 g. of water, and the slurry was allowed to stand for one hour for the purpose of settling out non-clay impurities, such as sand. Then the slurry was supercentrifuged under a force equal to 13,000 times the force of gravity to remove undispersed clay agglomerates and fine particle sized quartz and other abrasive foreign materials. The resulting grit-free slurry was composed of colloidal attapulgite crystals with a particle size predominantly less than 50 millimicrons in equivalent spherical diameter. The slurry was then dried under mild drying conditions (220° F.) to provide a grit-free colloidal fuller's earth having a free moisture content of at least 5% and preferably from 10 to 30%.

EXAMPLE I

In the preparation of grease, 120.5 g. of propane-deasphalted lubricating oil, having a viscosity of 85 seconds Saybolt Universal at 210° F. and a viscosity index of 80, was placed in a vessel (Waring Blendor) provided with a motor-driven mechanical agitator. To the oil, 5.7 g. (4%) of tallow fatty dialkyl dimethylammonium chloride, which may be produced by the method below described and is commercially available under the trade-name Arquad 2HT, was added with agitation. Then 15.0 g. (10.6%) of the colloidal clay (33.4% V.M. and 25% free moisture) was added and agitation continued at a rate such as to generate sufficient heat to vaporize the free moisture of the clay. At the instant vapor bubbles began to appear in the mixture, considerable thickening of the oil was observed to take place. Agitation was continued for several more minutes until gelling occurred. The bodied oil or grease after being cooled to a temperature of 77° F. was tested and found to have the properties given in the table.

EXAMPLE II

The process of Example I was repeated except that 5.7 g. (4.0%) of fatty dialkylamine acetate which may be produced by the method below described and is commercially available as Armac 2HT, was used as the dispersing agent. The resulting product was an excellent grease having the properties set forth in the table.

EXAMPLE III

The process of Example I was repeated except that 11.0 g. (7.5%) of tallow fatty dialkyl dimethylammonium chloride was used, and the oil consisted of 121.5 g. (82.3%) of blended bright stock and paraffin oil from paraffin wax sweating, having a viscosity of 115 seconds Saybolt Universal at 210° F. and a viscosity index of 85. The properties of the grease after cooling are presented in the table.

EXAMPLE IV

The process of Example I was repeated except that 11.0 g. (7.5%) of tallow fatty dialkylamine acetate was used as the dispersing agent, and the oil consisted of 121.5 g. (82.3%) of the blended bright stock and paraffin oil. The properties of the grease are given in the table.

EXAMPLE V

The process of Example I was repeated except that the clay used consisted of 12.5 g. (9.0%) of raw Washington nontronite (20.0% V.M. and free moisture content of 8.5%) ground to minus 60 mesh and having a surface area of 56 square meters per gram. The properties of the grease after cooling, are given in the table.

EXAMPLE VI

The process of Example I was repeated except that 5.0 g. (3.6%) of tallow fatty dialkyl dimethylammonium chloride was used, and the clay consisted of 13.4 g. of raw sub-bentonite from Lincoln-Union parishes area in Louisiana, ground to minus 60 mesh and having a surface area of 79 square meters per gram, a V.M. of 25.6%, and a free moisture content of 23.1%. The properties of the grease are presented in the table.

EXAMPLE VII

The process of Example I was repeated except that 5.0 g. (3.5%) of sodium lauryl sulfate was used as the dispersing agent, and the oil consisted of 121.5 g. (85.7%) of the blender bright stock and paraffin oil of Example III. The properties of the oil are set forth in the table.

EXAMPLE VIII

The process of Example I was repeated using 5.0 g. (3.6%) of sodium alkyl aryl sulfonate, produced commercially as described below, as the dispersing agent, 12.5 g. of the colloidal fuller's earth dried to a free moisture content of 11% and a V.M. of 20%, and 121.5 g. (82.8%) of the blended bright stock and paraffin oil. The properties of the grease are given in the table.

EXAMPLE IX

The process of Example I was repeated using as the clay 11.5 g. (8.4%) of Wyoming bentonite having a surface area of 25 square meters per gram and a free moisture content of 9.4% and a V.M. of 13.1%. The clay was ground to minus 60 mesh. The oil showed no tendency to gel or to form a grease.

*Properties of the grease products*

| Example | ASTM Penetration | |
| --- | --- | --- |
| | Unworked | Worked (60 double strokes) |
| I | 249 | 290 |
| II | 342 | 410 |
| III | 379 | 410 |
| IV | 222 | 269 |
| V | 335 | 348 |
| VI | 354 | 355 |
| VII | 332 | 335 |
| VIII | 320 | 320 |

From an examination of the table and the foregoing Examples I to IX, inclusive, it will be apparent that gels can be formed of organic liquids by the addition thereto of a dispersing agent and clay, having a surface area of 50 square meters per gram or more and having a free moisture content of at least 5% and preferably in the range of from 10 to 30%, with agitation while vaporizing a portion or all of the free moisture. Clay materials of lesser surface area such as the swelling bentonites are not satisfactory for the process. It is further apparent that any type of dispersing agent may be employed as desired.

Although in the foregoing examples, the process of the present invention was exemplified in connection with the preparation of grease, the process is also applicable for bodying oil to produce other products, and also for bodying other organic liquid, as shown by the examples below. There was no tendency for the clay to settle out of any of the products after 72 hours or more.

EXAMPLE X

An oil-base drilling fluid was prepared by first mixing 20 grams of the grit-free colloidal fuller's earth (free moisture content of 25%) with 260 grams diesel fuel oil, 4 grams of tallow fatty dialkyl dimethylammonium chloride, and 15 grams of barite (90% through 325 mesh). The mixture was agitated in a vessel (Waring Blendor) provided with a mechanical mixer, with heat being simultaneously applied. Light gelling occurred coincidentally with the vaporization of free moisture from the clay. No settling of the barite or other components of the dispersion occurred after 72 hours. The oil-base drilling fluid had a viscosity (Stormer—600 r.p.m.) of 59.4 cps.; a gel strength initially of 55 grams and after 10 minutes of 75 grams; and a fluid loss by API Code 29 of 33 cc. in 30 minutes.

EXAMPLE XI 121.5 g. of the deasphalted lubricating oil, referred to above, was mixed with 15 g. of the grit-free colloidal fuller's earth (free moisture content of 25%) and 0.7 g. of a dispersing agent sold under the trade name Victamine C and consisting of

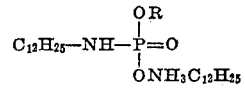

The procedure for preparing the material is well known and described in United States Patent No. 2,406,423. The mixture was agitated at a sufficiently high rate by means of a mechanical stirrer to elevate the temperature to 225° F. As the free moisture began to vaporize, the viscosity of the oil gradually increased. Although a stable dispersion of the clay in oil resulted accompanied by considerable increase in viscosity of the oil, the oil did not gel. However, upon the addition of 1 g. of ethylene diamine, the mixture instantly gelled. The grease upon cooling to 77° F. had an unworked ASTM penetration of 370.

EXAMPLE XII

Gelled gasoline was prepared first by placing 101 g. of gasoline in a Waring Blendor. To this was added 1.89 g. (1.6%) tallow fatty dialkyl dimethylammonium chloride and 12.5 g. (10.8%) of the grit-free colloidal fuller's earth (20% V.M. and 11% free moisture). The mixture was stirred at a rate such as to generate sufficient heat to vaporize the free moisture of the clay. At the instant vapor bubbles began to appear in the mixture, considerable thickening of the gasoline was observed. Agitation was continued for several more minutes until substantially all of the free moisture of the clay evaporated.

EXAMPLE XIII

Gelled capryl alcohol was prepared by the process of Example XII using 111 g. capryl alcohol, 5.7 g. (4.3%) tallow fatty dialkyl dimethylammonium chloride, and 15.0 g. (11.4%) of the colloidal fuller's earth dried to a V.M. of 33.4% and a free moisture content of 25%.

EXAMPLE XIV

Gelled soy bean oil was prepared by the process of Example XII using 116 g. of soybean oil, 5.0 g. (3.7%) tallow fatty dialkyl dimethylammonium chloride, and 12.5 g. (9.4%) of the colloidal fuller's earth dried to a V.M. of 20% and a free moisture content of 11%.

EXAMPLE XV

Gelled kerosene was prepared by the process of Example XII using 110 g. kerosene, 5.0 g. (3.9%) tallow fatty dialkyl dimethylammonium chloride, and 12.5 g. (9.8%) of the colloidal fuller's earth dried to a V.M. of 20% and a free moisture content of 11%.

EXAMPLE XVI

Carbon tetrachloride having greatly increased viscosity was prepared by the process of Example XII using 213 g. of carbon tetrachloride, 5.0 g. tallow fatty dialkyl dimethylammonium chloride, and 12.5 g. of the colloidal fuller's earth dried to a V.M. of 20% and a free moisture content of 11%.

EXAMPLE XVII

The viscosity of the propane deasphalted lubricating oil of Example I was increased by the process of Example XII using 120.5 g. of the oil, 13.3 g. (9.6%) Arizona bentonite (24.7% V.M. and 9.4% free moisture) having a surface area of 74 square meters per gram, and 5.0 g. (3.6%) of tallow fatty dialkyl dimethylammonium chloride.

EXAMPLE XVIII

The viscosity of the propane-deasphalted lubricating oil of Example I was increased by the process of Example XII using 120.5 g. of the oil, 12.6 g. (9.1%) of Utah halloysite (20.8% V.M. and 5.6% free moisture) having a surface area of 61 square meters per gram, and 5.7 g. (4.1%) tallow fatty dialkyl dimethylammonium chloride.

EXAMPLE XIX

The viscosity of the propane deasphalted oil of Example I was increased by the process of Example XII using 120.5 g. of the oil, 11.5 g. (8.4%) of California hectonite (13.2% V.M. and 10.6 free moisture) having a surface area of 93 square meters per gram, and 5.7 g. (4.1%) tallow fatty dialkyl dimethylammonium chloride.

EXAMPLE XX

Gelled kerosine was prepared by the process of Example XII using 110 g. of kerosine, 15.3 g. (11.7%) of the colloidal fuller's earth dried to a V.M. of 34.4% and 26.4% free moisture, and 5.0 g. (3.8%) of sodium lauryl sulfate.

EXAMPLE XXI

Gelled kerosine was prepared by the process of Example XII using 110 g. of kerosine, 12.3 g. (9.7%) of the colloidal fuller's earth (34.2% V.M. and 26.2% free moisture) and 5.0 g. (3.9%) of sorbitan polyoxyethylene trioleate, commercially available as Tween 85.

EXAMPLE XXII

Gelled kerosine was prepared by the process of Example XII using 110 g. of kerosine, 15.0 (11.7%) of the colloidal fuller's earth (33.4% V.M. and 25% free moisture), and 3.0 g. (2.3%) of polyoxyethylene thio-ether, commercially available as Sterox No. 5.

From Examples X to XXII, inclusive, it will be seen that by means of the process of the present invention the viscosity of organic liquids can be increased by dispersing therein clay materials having a surface area greater than 50 square meters per gram by the process of the present invention. The extent to which the viscosity of an organic liquid is increased is dependent upon the nature and amount of both the clay and the dispersing agent employed. Georgia-Florida fuller's earth, however, is particularly effective in the production of grease from oil as well as in forming gels of other organic liquids.

The tallow fatty dialkyl dimethylammonium chlorides useful as dispersing agents in the process of the present invention may be produced by obtaining fatty acids from tallow either by the well-known soap-kettle procedure of saponification with alkali followed by acidulation or by other fatty splitting methods. The fatty acids are reacted with ammonia to form ammonium salts, which on heating yield fatty acid amides and water. Then the amides are refluxed in the presence of aluminum oxide catalyst to obtain fatty acid nitriles. Secondary fatty amines are then formed by hydrogenation of the nitriles using, for example, a palladium, nickel, or copper chromite catalyst in accordance with the method described by Schwoegler and Adkins in their article entitled "Preparation of Certain Amines" on page 3499, Journal of the American Chemical Society, vol. 61, 1939. Finally, tallow fatty dialkyl dimethylammonium chlorides are formed by reacting the secondary amines with methyl chloride. Further, a process for production of dialkyl dimethylammonium chloride from fatty acids, and which is applicable to the production of such compounds from fatty acids obtained by hydrolyzing tallow, described in detail by Ralston, Peck, Harwood, and du Brow in their article entitled "The Solubilities of Long-Chain Dialkyl-dimethylammonium Chlorides in Organic Solvents," on page 186, Journal of Organic Chemistry, vol. 13, 1948.

The tallow fatty dialkylamine acetates useful as dispersing agents in the proces of the present invention likewise may be produced from the secondary fatty amines, formed in the manner described above from tallow. In this case, the secondary amines are reacted with glacial acetic acid to provide the desired product.

A detailed procedure for commercially manufacturing both the tallow fatty dialkyl dimethylammonium chlorides and the tallow fatty dialkylamine acetates is described by Kenyon, Stingley, and Young in their article entitled "Chemicals From Fats," on page 202, Industrial and Engineering Chemistry, vol. 42, No. 2, February 1950. Methods for the preparation of these dispersing agents thus are well known and form no part of the present invention.

The alkylated aryl sulfonates used in Example VIII are also commercially available dispersing agents and may be produced by polymerizing a gaseous mixture containing predominantly propylene (80%) with minor amounts of propane and lower boiling hydrocarbons, using a supported phosphoric acid catalyst at 500° F. and 400 lbs./sq. in. pressure, to obtain a mixture of propylene polymers from which was separated by fractional distillation, a fraction averaging 12 carbon atoms per molecule. This fraction was then employed to alkylate benzene, using $AlCl_3$ as a catalyst at 150° F. The resulting mixture of alkylated benzenes was distilled to recover a fraction averaging 12 carbon atoms in the alkyl group (the fraction actually contained minor amounts of $C_9$–$C_{15}$ alkyl benzenes). This fraction, upon sulfonation with 98% sulfuric acid at 160° F., yielded the corresponding alkyl benzene sulfonic acids, which, after separation from the spent sulfuric acid, were neutralized with sodium hydroxide and recovered as essentially sodium dodecyl benzene sulfonates containing a small amount of inorganic salts, i.e., sodium sulfate. The general procedure for manufacturing sulfonates of this type is described in various United States patents, including U.S. Nos. 1,992,160; 2,232,118; 2,430,673; 2,477,382; and 2,477,383, and does not constitute any part of the present invention.

Other surface-active agents or wetting agents which are especially useful in accordance with this invention, and which are readily and economically produced are the lignin sulfonates and the salts of acids resulting from the oxidation of petroleum fractions, particularly paraffinic oils and waxes. The preferred lignin sulfonates may be produced by treating the lignin sulfonic acids (a by-product of the sulfite process used in the preparation of wood pulp) with a base such as an alkali metal hydroxide or ammonia.

The alkali metal and ammonium salts of the acids resulting from the oxidation of paraffinic oils and waxes are readily available at relatively low cost, and comprise very satisfactory dispersing agents. Petroleum fractions, and particularly low melting waxes, foots oil, and paraffin wax may be oxidized simply by air blowing at elevated temperature (230° F. to 400° F.), preferably in the presence of an oxidation catalyst, for example, cobalt or manganese stearates or naphthenates, and the resulting oxidation products such as carboxylic acids, hydroxy acids, keto acids, aldehydes, ketones, and esters, after removal of unoxidized hydrocarbons, may be reacted with ammonia to give dispersing agents.

We claim:

1. A process for increasing the viscosity of an organic liquid comprising mixing with the organic liquid a dispersing agent and a naturally-occurring clay, having a surface area of at least 50 square meters per gram and a free-moisture content of at least 5 percent by weight, applying shear to the mixture, and simultaneously vaporizing a portion of the free moisture of the clay thereby to substantially completely disperse the clay in the organic liquid.

2. A process for increasing the viscosity of an organic liquid comprising mixing with the organic liquid a dispersing agent in an amount of from ½ to 10 percent by weight and a naturally-occurring clay, having a surface area of at least 50 square meters per gram and a free moisture content of at least 5 percent by weight, in an amount of from 1 to 15 percent by weight on a volatile-free basis, applying shear to the mixture, and simultaneously vaporizing a portion of the free moisture of the clay thereby to substantially completely disperse the clay in the organic liquid.

3. The process according to claim 2, wherein the clay comprises Georgia-Florida fuller's earth.

4. The process according to claim 2, wherein the clay comprises sub-bentonite.

5. The process according to claim 2 wherein the clay comprises halloysite.

6. The process according to claim 2 wherein the clay comprises nontronite.

7. A process for increasing the viscosity of an organic liquid comprising mixing with the organic liquid a dispersing agent and Georgia-Florida fuller's earth, having a free-moisture content adjusted to between 5 and 30 percent, in an amount of from 1 to 15 percent on a volatile-free basis, agitating the mixture, and simultaneously vaporizing a portion of the free moisture of the clay.

8. A process for producing grease comprising mixing with petroleum oil a dispersing agent and Georgia-Florida fuller's earth, having a free moisture content adjusted to between 5 and 30 percent by weight, in an amount of from 3 to 9 percent by weight on a volatile-free basis, agitating the mixture, and simultaneously applying heat to the mixture to vaporize a portion of the free moisture content of the clay.

9. A process for producing grease comprising mixing with petroleum oil a dispersing agent and nontronite, having a free moisture content adjusted to between 5 and 30 percent by weight, in an amount of from 3 to 9 percent by weight on a volatile-free basis, agitating the mixture, and simultaneously applying heat to the mixture to vaporize a portion of the free moisture content of the clay.

10. A process for producing grease comprising mixing with petroleum oil a dispersing agent and sub-bentonite clay, having a free moisture content of between 5 and 30 percent by weight, in an amount of from 3 to 9 percent by weight on a volatile-free basis, agitating the mixture, and simultaneously applying heat to the mixture to vaporize a portion of the free moisture content of the clay.

References Cited in the file of this patent

UNITED STATES PATENTS

| | | |
|---|---|---|
| 1,517,577 | Olsson | Dec. 4, 1924 |
| 2,531,440 | Jordan | Nov. 28, 1950 |
| 2,531,812 | Hauser | Nov. 28, 1950 |
| 2,554,222 | Stross | May 22, 1951 |
| 2,573,650 | Peterson | Oct. 30, 1951 |
| 2,584,085 | Stross | Jan. 29, 1952 |
| 2,594,822 | Stross et al. | Apr. 29, 1952 |
| 2,599,683 | Abrams et al. | June 10, 1952 |
| 2,623,852 | Peterson | Dec. 30, 1952 |
| 2,623,853 | Stross | Dec. 30, 1952 |
| 2,626,899 | Abrams et al. | Jan. 27, 1953 |
| 2,662,056 | McCarthy | Dec. 8, 1953 |